United States Patent Office 3,345,440
Patented Oct. 3, 1967

3,345,440
METHOD FOR MANUFACTURING FOAM
CARBON PRODUCTS
John M. Googin and John M. Napier, Oak Ridge, and Michael E. Scrivner, Knoxville, Tenn., assignors to the United States of America as represented by the United States Atomic Energy Commission
No Drawing. Filed June 29, 1965, Ser. No. 468,168
10 Claims. (Cl. 264—29)

ABSTRACT OF THE DISCLOSURE

A cellular carbon product is prepared by admixing partially polymerized furfuryl alcohol with urethane foam forming chemicals and thereafter successively heating the resulting foam structure to cure the furfuryl alcohol and subsequently decompose the urethane and convert the cured furfuryl alcohol to carbon for forming the cellular carbon product. Powdered graphite, metals, and/or nonmetals such as boron and silicon can be added to the mixture to provide variations of the cellular product, e.g., a cellular graphite product, a cellular metal or nonmetal product, or a cellular carbide product. These latter products are achieved by heating the cured foam structures to temperatures as high as 2500° C.

The present invention relates generally to foamed products and their manufacture and more particularly to carbon- and/or metal-containing foams and manufacture.

Foamed materials, such as carbon foams, with their relatively high mechanical strength, low bulk density, and excellent thermal stability have found widespread utility as porous structures for various applications. Such foamed materials, for example, are excellent thermal insulators and are especially attractive as strong, lightweight materials of construction in the aerospace industry. These foamed materials, whether they be metallic or non-metallic porous bodies, have generally been heretofore prepared by mixing a refractory filler such as carbon or metal powder with a volatile material which, upon application of heat, will volatilize forming the porous structure. In the manufacture of carbon foams, for example, a urethane foaming system has heretofore been employed. When mixed, the urethane chemical compounds react, application of heat sometimes being required, to produce carbon dioxide gas which acts to "expand" the system and produce a uniform cellular structure. Subsequent curing the cellular structure by heating at low temperature produces a rigid foamed product.

While the carbon foams prepared by the urethane-base system have generally been satisfactory for various applications, they have certain drawbacks. The foamed products are limited, as to their properties, to a narrow range for any specific property. Due to the low carbon yield after pyrolysis carbon foams prepared from the urethane-base system are characterized by a weakly joined foamed structure which is highly susceptible to shrinking and cracking, resulting in inferior products. Moreover, the urethane-type carbon foams cannot withstand extremely high temperatures, e.g., up to about 2500° C., and are not dimensionally stable with humidity changes.

It is therefore a primary object of this invention to provide a method for preparing carbon and/or metal formed products or mixtures thereof which are adapted for extremely high temperature operation and which undergo essentially little or no dimensional change with humidity changes.

Still another object is to provide a method for manufacturing an improved foamed product which has essentially uniform cell structure and is readily machinable in a variety of shapes and sizes, employing conventional machining equipment.

A still further object is to provide a method for preparing foamed materials which have a broad range of density properties with correspondingly wide utility.

In accordance with this invention a method for preparing a foamed body is provided comprising the steps of mixing partially polymerized furfuryl alcohol (with or without an acid catalyst) with urethane-forming compounds prior to the foaming process, forming a cellular structure by the interaction of said urethane compounds, heating the resulting structure to a temperature below the decomposition temperature of said urethane to cure said furfuryl alcohol and thereafter heating said structure to an elevated temperature to first decompose said urethane and then convert said cured furfuryl alcohol to carbon. In an alternative embodiment of this invention powdered graphite, nonmetals and/or metal, or metal oxide powder may be added to the foam mixture prior to the foaming thereof for producing foamed products having specific properties. In general, graphite increases the product density and the metals, such as tungsten, tantalum, niobium, and aluminum and nonmetals such as boron, and silicon, impart increased strength or other specific properties to the porduct. Moreover, metal or nonmetal carbides or a carbon-metal mixture may be prepared by controlling the process environment and temperatures. Carbon foams have been prepared having densities ranging from 0.02 to 0.7 gram per cubic centimeter and which are readily machinable into any shape or size desired. Additionally, the hydroscopic properties of such foams are quite low compared with prior art polyurethane foams, and applicants have found that the carbon foamed products are essentially dimensionally stable under moist environments.

The foamed structure is prepared from a mixture of urethane chemicals and a binder. It should be appreciated that other materials, such as graphite and/or metal or metal oxide powders, may be mixed with the basic ingredients to achieve desired properties of the finished product. Applicants have found that the use of partially polymerized furfuryl alcohol, commercially available under the name "Varcum" and hereinafter referred to as "Varcum," as the binder is critical to the successful practice of this invention. Foamed articles prepared from urethane base systems, but without Varcum as the binder, experienced cell collapse and failure of the foamed structure. While a wide variety of urethane chemicals have hereinbefore been employed in the urethane system, applicants prefer a two-component urethane system comprising tolylene diisocyanate (designated as the C or T compound) and a polyhydric alcohol resin (designated as the R compound).

In preparing the foaming mixture for carbon foams, the order and techniques may vary widely. Where graphite and/or metal foams are contemplated, however, applicants have found that a certain order of mixing yields substantially identical properties of the final product for different runs and is preferred. This order consisted of adding the polyhydric alcohol resin (R) compound to the Varcum. With continued stirring the graphite flour and/or metal powder is added to the resultant mixture and after thorough mixing the isocyanate (T) compound is added to complete the formulation. Due to the high viscosity of the urethane components it is preferable to heat the compounds prior to mixing to enhance homogeneity of the resulting mixture. After thorough mixing is achieved, the mixture is poured into a mold, which has been preheated to a temperature of about 60° C., to allow foaming to take place. The molds may be of any conventional structural material such as aluminum and should preferably be treated with a mold-release compound to facilitate product removal. In carrying out this phase of the operation, the mold may be open or closed to the atmosphere by employment of a suitable lid or covering. Where the mold is open to the atmosphere, the foam is free to rise in the mold with the amount of rise being determined by the formulation used and temperatures of the mixture and mold. On the other hand, where the mold is closed, the foaming reaction is effected by adding a weighed amount of the foaming mixture to the mold and placing the lid on the mold to restrain or constrict the rise of the foamed structure. For this, the weight added is calculated so that when the mass has arisen and completely filled the mold, the desired density is defined.

After the material is poured into the heated mold, it is left undisturbed for a period of about one hour, whereupon it is then placed in an oven and maintained at a temperature of about 70° C. for an extended period of time to cure the material. A period of time of between 16 and 20 hours has been quite satisfactory with a longer period of time (~48 hours) being suitable. During this curing step a thin skin forms on the surfaces of the casting which should be removed to expose the cells and facilitate subsequent curing operationgs. While the skin may be removed as soon as the casting has cooled to room temperature, the skin is more readily removed after setting for a couple of days.

At this stage the urethane is cured and the foamed structure is somewhat pliable and care should be used in handling the casting. The casting is next placed in a furnace, which may be provided with recirculating air flow, and slowly heated to an elevated temperature to cure the Varcum. The heating step is preferably carried out at a temperature of about 250° C., using a programmed heat-up that requires approximately 72 hours. Then the casting is heated to a temperature above 450° C., preferably about 1000° C. in an inert atmosphere such as nitrogen, to decompose the urethane and carbonize the Varcum resin. Again a programmed heatup requiring approximately 48 hours is preferred. Finally the casting is heated to a temperature of about 2500° C., to graphitize the cured Varcum. It should be noted here that this last heating step is only required where graphite and/or metal carbide foams are produced. For carbon foams final temperatures of about 1000° C. are sufficient. Where, for example, a metal or nonmetal carbide foamed body is desired, the same process steps used for preparing a carbon foam are employed with the exception that metal or nonmetal powder is added to the foaming mixture initially and the final heating operation is carried out at such a temperature to convert the metal or nonmetal to the carbide.

Further illustration of the quantitative aspects and procedures of the present invention is provided in the following examples.

*Example I*

A foamed carbon body having a density of approximately 0.04 gm./cc. was prepared as follows: 828 grams of a polyhydric alcohol resin, known commercially as "Stafoam 4002–45R" (manufactured by the American Latex Products Corporation), was mixed with 1200 grams of partially polymerized furfuryl alcohol (Varcum) and 134 grams of water, with stirring. After five minutes of additional stirring, 1274 grams of tolylene diisocyanate, known commerically as "Stafoam 4002–45T" (manufactured by the American Latex Products Corporation), was added, with stirring, and stirred for two minutes.

The resulting solution was quickly poured into a heated aluminum mold (17" x 17" x 4") which had previously been heated to 50° C., whereupon foaming commenced which was allowed to advance to completion (requiring at least one hour). The foamed material was cured for 16 hours in a 120° C. air atmosphere oven and then cooled to room temperature and the cured casting removed from the mold.

After removal from the mold, a thin skin which formed on all surfaces of the casting during the initial curing operation was removed with a metal rasp and the exposed casting heated in an air atmosphere oven at a temperature of 250° C. to cure the Varcum. In carrying out this heating operation, a programmed heat-up was employed which required 72 hours with soak periods provided at 95°, 115°, 140°, and 190°.

Thereafter the cured casting was heated to 1000° C. in an inert atmosphere (nitrogen) to decompose the urethane and convert the Varcum to carbon.

The resultant foamed product was a rigid cellular structure readily machinable into various shapes and sizes and dimensionally stable when exposed to moist environments. Strength tests yielded a compressive strength of 44 p.s.i.

*Example II*

A graphite foam having a density of 0.5 gm./cc. was prepared as in Example I, but using the following formulation: 4050 grams of Varcum, 2754 grams of Stafoam 4002–45R, 7650 grams of Great Lakes Graphite Flour 1008, and 4248 grams of Stafoam 4002–45T. The graphite flour was added gradually, with stirring, and stirred for five minutes after all of the graphite powder had been added. The T compound was then added and stirred for two minutes. Curing and bake cycles were as in Example I, with the exception that an additional bake cycle was employed wherein the casting was heated to 2500 C. to graphitize the carbon formed from the Varcum. Approximately 25 hours were required to reach 2500° C.

The resultant foamed product was less hygroscopic than the carbon foam of Example I. The finished article, weighing 15 grams, gained only 0.0127% when exposed to a moist atmosphere (100% relative humidity) at a temperature of about 240° C. for 64 hours and had a compressive strength of 750 p.s.i.

*Example III*

A silicon carbide foam was prepared using the procedures and techniques of Example I. The foaming mixture consisted of 1587 grams of Stafoam 4002–45T, 2271 grams of Varcum, 3450 grams of silicon, and 1032 grams of Stafoam 4002–45R. The casting was heated to 1000° C. in a nitrogen atmosphere to decompose the urethane and carbonize the Varcum resin. Thereafter, the casting was fired to 2200° C. to react the carbon with the silicon. The resultant density was 0.39 gm./cc. This product was next fired in air at 1000° C. for 12 hours to burn out the excess carbon. The final product had a density of 0.34 gm./cc.

Where, for example, $SiO_2$ is desired, the casting should be heated to 1000° C. in nitrogen and then fired in air at 1500° C. Where a silicon metal foam is desired, the casting should be heated in nitrogen to 1000° C. to decompose the urethane and then fired in wet hydrogen at 1000° C. to burn out any carbon present.

*Example IV*

An aluminum oxide foam was prepared using the procedures and techniques of Example I. The foaming mixture consisted of 285 grams of Stafoam 4002–45T, 338 grams of Varcum, 1546 grams of $Al_2O_3$, and 300 grams of Stafoam 4002–45R. The casting was heated to 880° C. in a nitrogen atmosphere to decompose the urethane and carbonize the Varcum resin. The casting was then heated to 1600° C. in air to burn out the carbon, leaving a refractory aluminum oxide.

It should be apparent to those skilled in the art that the density of the finished foamed product is controlled by the Varcum to urethane ratio and resin to water ratio. Moreover, the stoichiometry of the specific metal compound attained is controlled by the metal to Varcum ratio.

Accordingly, while specific examples have been hereinbefore recited, these are not to be construed as limiting the scope of the present invention, but the process of this invention is widely applicable to preparing foams of different density and composition.

What is claimed is:

1. A method for preparing a cellular carbon product, comprising the steps of admixing partially polymerized furfuryl alcohol with urethane compounds capable of interacting to form a cellular urethane structure, forming a cellular structure by the interaction of the urethane compounds in the mixture, heating the resulting cellular structure to a temperature below the decomposition temperature of the urethane and sufficient to cure the furfuryl alcohol in the structure, and thereafter heating the cellular structure to a temperature greater than the decomposition temperature of the urethane and sufficient to carbonize the furfuryl alcohol for forming a cellular carbon product.

2. The method for preparing a cellular carbon product as claimed in claim 1, wherein the first mentioned heating step is carried out at a temperature of about 250° C., and wherein the heating step for carbonizing the furfuryl alcohol is carried out at a temperature in a range of 450° C. to about 1000° C.

3. The method for preparing a cellular carbon product as claimed in claim 1, wherein the urethane compounds consist essentially of tolylene diisocyanate and a polyhydric alcohol resin.

4. A method for preparing a cellular graphite product, comprising the steps of admixing partially polymerized furfuryl alcohol and graphite flour with urethane compounds capable of interacting to form a cellular urethane structure, forming a cellular structure by the interaction of the urethane compounds in the mixture, heating the resulting cellular structure to a temperature below the decomposition temperature of the urethane and sufficient ot cure the furfuryl alcohol in the mixture, and thereafter successively heating the cellular structure to a temperature greater than the decomposition temperature of the urethane and sufficient to carbonize the furfuryl alcohol and then to a temperature sufficient to convert the carbon to graphite for forming a cellular graphite product.

5. The method for preparing a cellular graphite product as claimed in claim 4, wherein the temperature sufficient to cure the furfuryl alcohol is about 250° C., the temperature sufficient to carbonize the furfuryl alcohol is in a range up to about 1000° C., and wherein the temperature sufficient to convert the carbon to graphite is in a range up to about 2500° C.

6. A method for preparing a cellular product comprising the steps of admixing partially polymerized furfuryl alcohol and at least one particulate material selected from the group consisting of metals, metal oxides, and carbide-forming non-metals with urethane foam-forming compounds, forming a cellular structure by the interaction of said urethane compounds, heating the resulting structure to a temperature below the decomposition temperature of said urethane to cure said furfuryl alcohol, further heating the structure to a temperature sufficient to decompose said urethane and convert said cured furfuryl alcohol to carbon, and thereafter heating the carbon-containing structure to a temperature sufficient to effect a cellular product formed at least substantially of said material.

7. The method of claim 6, wherein the first mentioned heating step is carried out at a temperature of about 250° C., the heating step for decomposing said urethane and converting the furfuryl alcohol to carbon is carried out at a temperature up to about 1000° C., and wherein the heating of the carbon-containing structure is carried out at a temperature up to about 2500° C.

8. The method of claim 6, wherein said material is selected from the group consisting of tungsten, tantalum, niobium, aluminum, boron, and silicon.

9. The method of claim 6, wherein said material is tungsten and wherein the heating of the carbon-containing structure is carried out at a temperature above 1700° C. for converting the tungsten to tungsten carbide.

10. The method of claim 6, wherein the heating of the carbon-containing structure forms a cellular product consisting essentially of a carbide of said material.

References Cited

UNITED STATES PATENTS

| | | | |
|---|---|---|---|
| 2,917,384 | 12/1959 | Grandey | 260—2.5 |
| 3,078,552 | 2/1963 | Grandey | 75—222 X |
| 3,111,396 | 11/1963 | Ball | 264—44 |
| 3,121,050 | 2/1964 | Ford | 264—29 |

ROBERT F. WHITE, Primary Examiner.

J. A. FINLAYSON, Assistant Examiner.